(12) United States Patent
Zhang et al.

(10) Patent No.: US 12,507,823 B2
(45) Date of Patent: Dec. 30, 2025

(54) JUICER AND JUICE EXTRACTION SCREW THEREOF

(71) Applicant: ISLOW ELECTRIC (SHENZHEN) CO., LTD., Guangdong (CN)

(72) Inventors: Xu Zhang, Shenzhen (CN); Enshi Zhu, Shenzhen (CN)

(73) Assignee: ISLOW ELECTRIC (SHENZHEN) CO., LTD., Shenzhen (CN)

( * ) Notice: Subject to any disclaimer, the term of this patent is extended or adjusted under 35 U.S.C. 154(b) by 0 days.

(21) Appl. No.: 18/902,726

(22) Filed: Sep. 30, 2024

(65) Prior Publication Data

US 2025/0017407 A1 Jan. 16, 2025

Related U.S. Application Data

(63) Continuation of application No. 18/632,441, filed on Apr. 11, 2024, which is a continuation of application No. 17/263,166, filed as application No. PCT/CN2019/114554 on Oct. 31, 2019, now Pat. No. 11,957,263.

(30) Foreign Application Priority Data

Dec. 12, 2018 (CN) .......................... 201811517212.1
Dec. 12, 2018 (CN) .......................... 201822089622.2

(51) Int. Cl.
*A47J 19/02* (2006.01)
*A23N 1/02* (2006.01)

(52) U.S. Cl.
CPC .............. *A47J 19/025* (2013.01); *A23N 1/02* (2013.01); *A47J 19/023* (2018.08)

(58) Field of Classification Search
CPC ........ A47J 19/025; A47J 19/023; A47J 19/02; A23N 1/02
USPC ........................................... 99/501, 502, 503
See application file for complete search history.

(56) References Cited

U.S. PATENT DOCUMENTS

2016/0021924 A1\* 1/2016 Kim .......................... A23N 1/02
99/513

FOREIGN PATENT DOCUMENTS

| KR | 100966607 | B1 | \* | 6/2010 | ............ | A47J 19/025 |
| KR | 101181103 | B1 | \* | 9/2012 | ............ | A47J 19/025 |
| KR | 101257441 | B1 | \* | 4/2013 | ............ | A47J 19/025 |
| KR | 200475273 | Y1 | \* | 11/2014 | ............ | A47J 19/025 |
| KR | 20150041558 | A | \* | 4/2015 | ............ | A47J 19/025 |

(Continued)

*Primary Examiner* — Reginald Alexander
(74) *Attorney, Agent, or Firm* — Yong Chen

(57) ABSTRACT

A juicer includes a housing having a top and including a juice spout on a periphery surface, and a support on a bottom. A filtering mechanism is disposed in the housing and includes a cylindrical wall having a meshed screen portion, and at least one annular flange on an outer surface. A rotating mechanism is disposed in the filtering mechanism, the rotating mechanism including a screw comprising a bolt portion and a spiral portion formed on a peripheral of the bolt portion and extending spirally upward to form a top free end. A bottom of the rotating mechanism is coupled to an electric motor and rotatable about a rotating axis of the electric motor. The top free end of the screw is located at an eccentric position relative to the rotating axis. A feed chute is disposed on and engaging the top of the housing. A bottom surface of the rotating mechanism is rested upon the support of the housing.

14 Claims, 4 Drawing Sheets

(56) References Cited

FOREIGN PATENT DOCUMENTS

| KR | 20150124307 A | * | 11/2015 | ............... | A47J 19/06 |
| WO | WO-2016009164 A1 | * | 1/2016 | ........... | A47J 31/4403 |
| WO | WO-2019062330 A1 | * | 4/2019 | .......... | A47J 43/0722 |
| WO | WO-2019227632 A1 | * | 12/2019 | ............ | A47J 19/025 |

* cited by examiner

JUICER AND JUICE EXTRACTION SCREW THEREOF

FIELD

The invention relates to juicers, and more particularly, to a juicer and a screw extrusion juice extraction screw thereof.

BACKGROUND

A juicer is a tool used to extract juice from fruits, herbs, leafy greens and other types of vegetables in a process called juicing. It crushes, grinds, and/or squeezes the juice out of the pulp. Some types of juicers can also function as a food processor.
A conventional juicer comprises a base, a juice collection container connected to the base, a filter in the juice collection container, a rotating mechanism in the filter, a feed chute on the juice collection container, and a passageway through the feed chute for communicating with the juice collection container. Produce may pass the passageway to be compacted and crushed into smaller sections in the space between the filter and the rotating mechanism by the rotating mechanism before squeezing out its juice through the filter.

Chinese Patent Number CN103393338A discloses a juicer comprising a housing, a filter, a rotating mechanism, a juice collection mechanism, and a feed chute on the housing. Produce may pass the feed chute to be compacted and crushed into smaller sections in the space between the filter and the rotating mechanism by the rotating mechanism before squeezing out its juice through the filter. The juice collection mechanism includes a crushing member and a collection member. The crushing member is tapered upward and formed on a top of the rotating mechanism. A screw blade is formed on the crushing member. The collection member is connected to the feed chute and has a concave surface on a bottom of the feed chute for accommodating the crushing member. The screw blade may compact and crush the produce in the crushing member into smaller sections. It is advantageous for automatically juicing without the need of manually pushing the produce through the feed chute.

However, the conventional juicer has the following drawbacks: A position axis is provided on a top of the rotating mechanism. Thus, the rotating mechanism is located at a position having an increased elevation for accommodating larger produce. Further, the feed chute is obliquely disposed. All of these increases the size of the juice, increases the manufacturing cost, and is not convenient in storage and delivery. The discharge opening of the inclined feed chute is relatively small and thus significantly decreases the amount of produce to be fed. Juicing performance is low.

Thus, the need for improvement still exists.

SUMMARY

The invention has been made in an effort to solve the problems of the conventional art by providing a juicer and rotating mechanism thereof having novel and nonobvious characteristics. To achieve above and other objects of the invention, the invention provides a rotating mechanism of a juicer, comprising a crushing member in the form of a helical screw blade wherein a top of the crushing member extends upward; a space is formed between a filtering mechanism and the crushing member for accommodating produce having a size greater than a radius of the helical screw blade passing through a feed chute; and a rotational axis of the crushing member is within a horizontal projection of the space.

Preferably, the crushing member is connected to the feed chute and has a concave surface on a bottom of the feed chute.

Another object of the invention is to provide a juicer comprising a removable housing; a feed chute on a top of the housing; a filtering mechanism in the housing; and a rotating mechanism in the filtering mechanism. The rotating mechanism includes a helical screw blade on an outer surface; a space is formed between the filtering mechanism and the rotating mechanism for accommodating produce passing through the feed chute; and both a rotational axis of the rotating mechanism and the feed chute are within a horizontal projection of the space.

Preferably, the rotating mechanism includes an annular flange on a bottom of an outer surface, the housing includes an annular groove on a bottom of an inner surface for the receipt of the annular flange, and the filtering mechanism includes an annular flange on a bottom of an outer surface; and wherein the annular flange of the filtering mechanism is disposed in the housing urging against the annular flange of the rotating mechanism.

Preferably, the feed chute includes an annular groove adapted to fit in a complementary top of the filtering mechanism; and the feed chute is rested on the housing.

Preferably, the filtering mechanism includes a frame and at least one screen mounted to the frame.

Preferably, the screen includes meshes.

Preferably, the screen is either releasably mounted to the frame or integrally formed therewith.

Preferably, the filtering mechanism includes a plurality of longitudinal ridges on an inner surface; and widths of the ridges are tapered downward.

Preferably, the housing includes a plurality of bent projections on an inner surface of a top, and a plurality of troughs each abutted on the projection from below; the feed chute includes a plurality of protuberances on an outer surface of a bottom; and wherein the protuberances are complimentarily disposed in the troughs when the feed chute and the housing are assembled.

The juicer and rotating mechanism thereof of the invention has the following advantageous effects in comparison with the prior art: The eccentric location of the top of the screw blade, the rotational axis of the rotating mechanism is directly under the passageway, and the rotational axis of the rotating mechanism within the horizontal projection of the space all contribute to the increase of the space which can accommodate the produce having width greater than radius of the rotating mechanism. Thus, there is no need of cutting the produce into smaller sections prior to juicing operation. Further, the produce is prevented from clogging the space. As a result, the juicing has an increased performance.

The above and other objects, features and advantages of the invention will become apparent from the following detailed description taken with the accompanying drawings.

DETAILED DESCRIPTION

Figure 1:
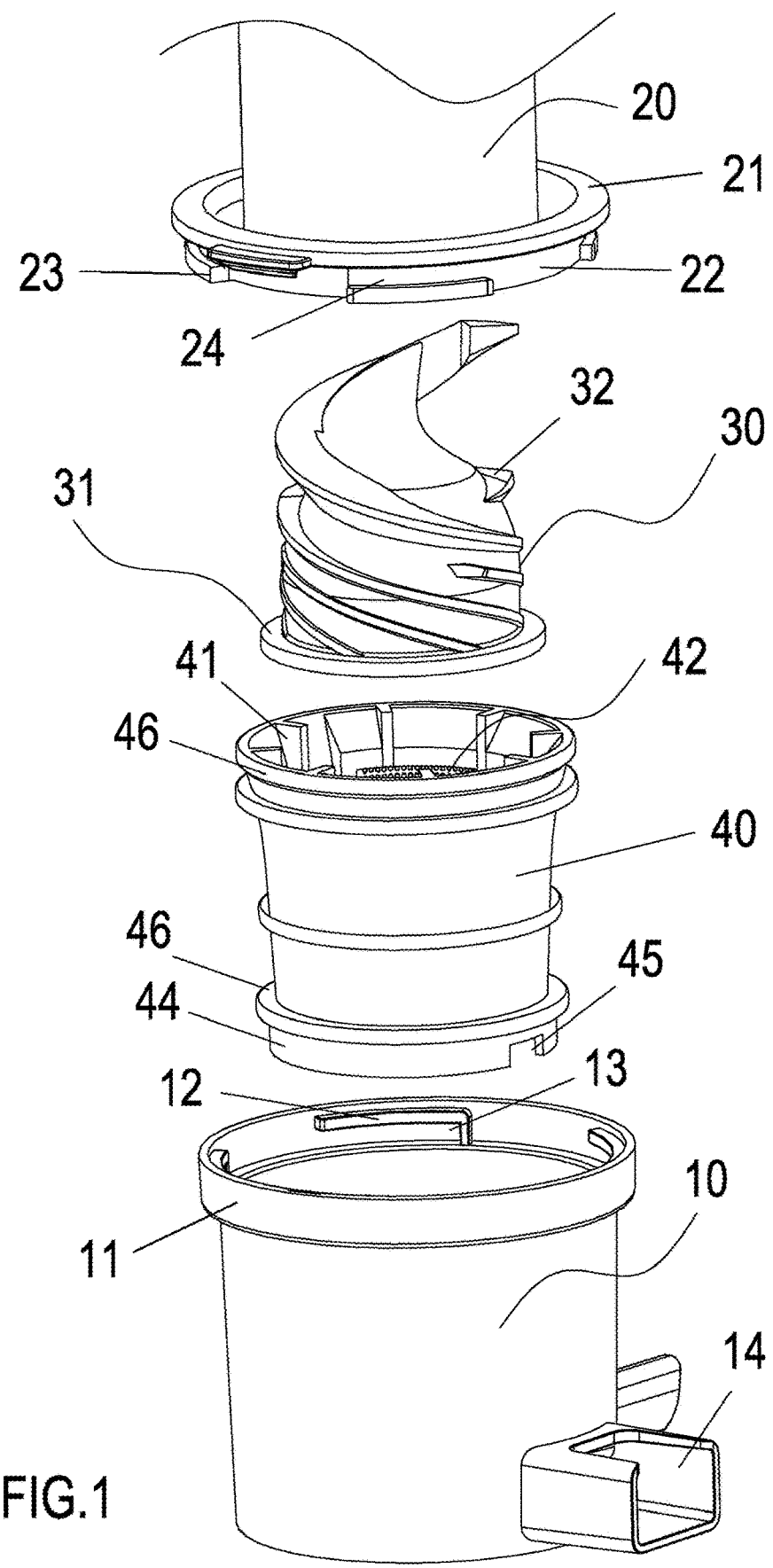
FIG. 1 is an exploded view of a juicer according to the invention.
Figure 2:
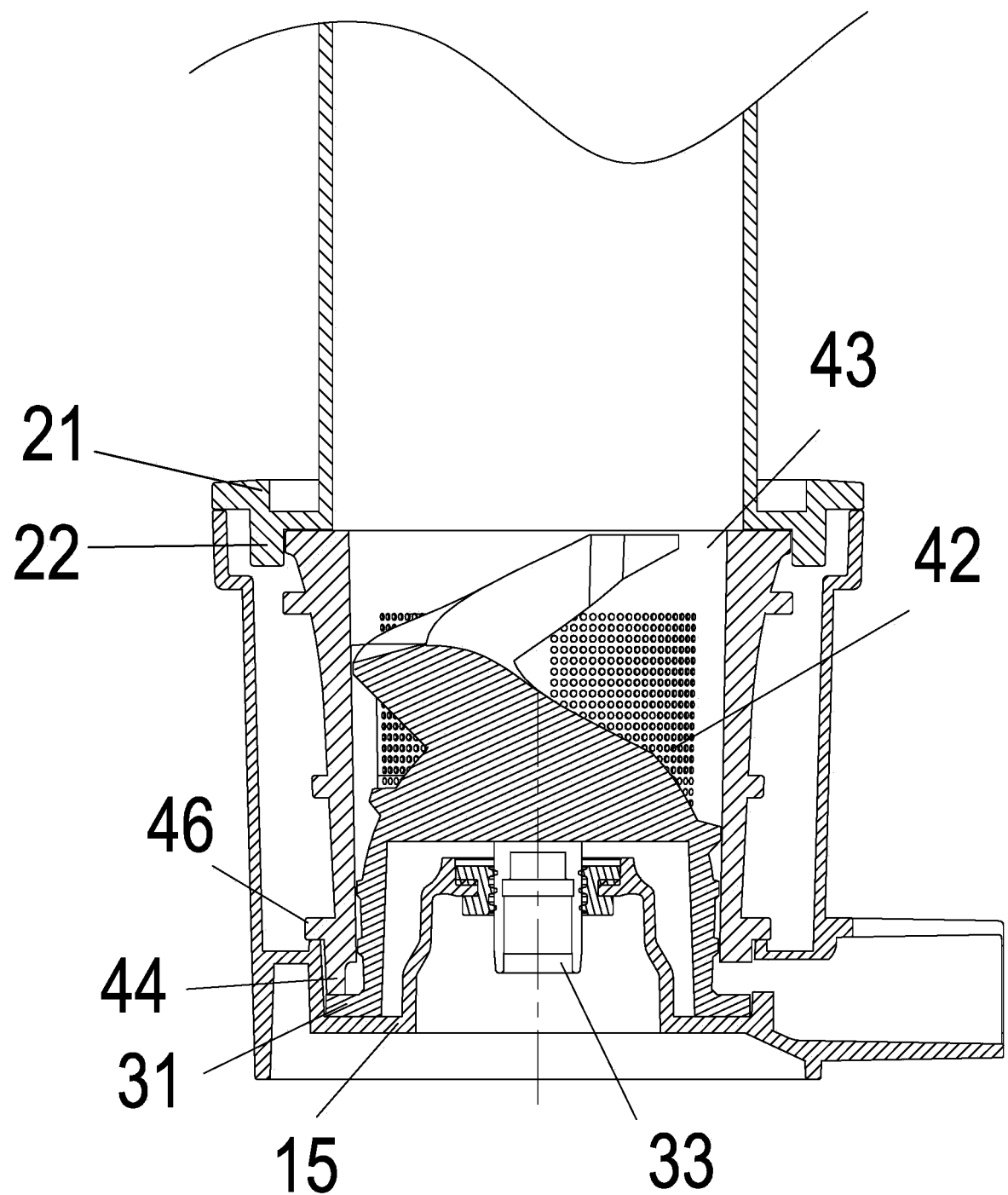
FIG. 2 is a longitudinal sectional view of the assembled juicer.
Figure 3:
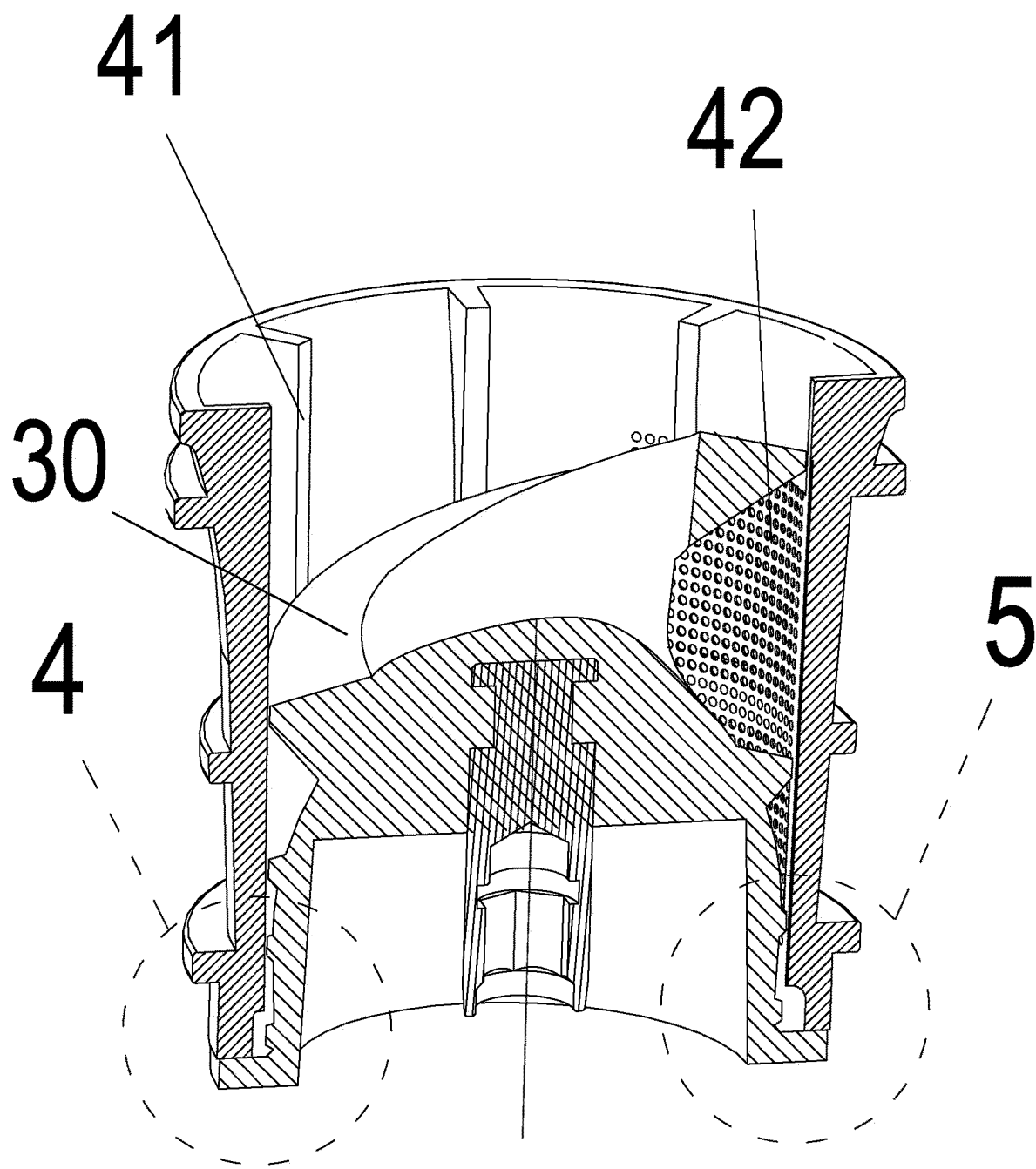
FIG. 3 is a cut-away fragmentary view of the filtering mechanism and the rotating mechanism.
Figure 4:
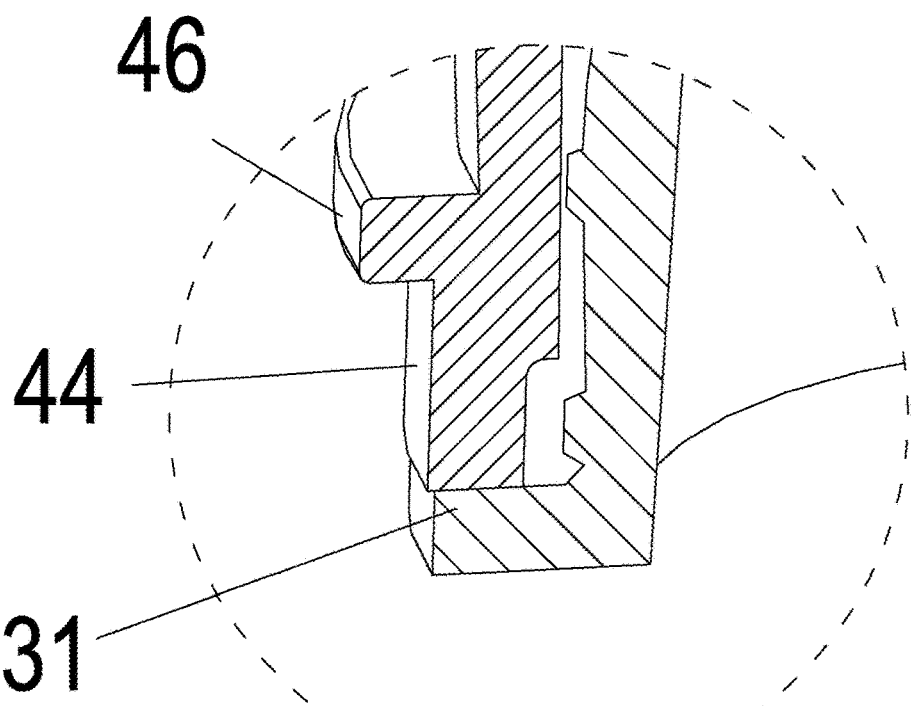
FIG. 4 is a detailed view of the area in circle 4 of FIG. 3.
Figure 5:
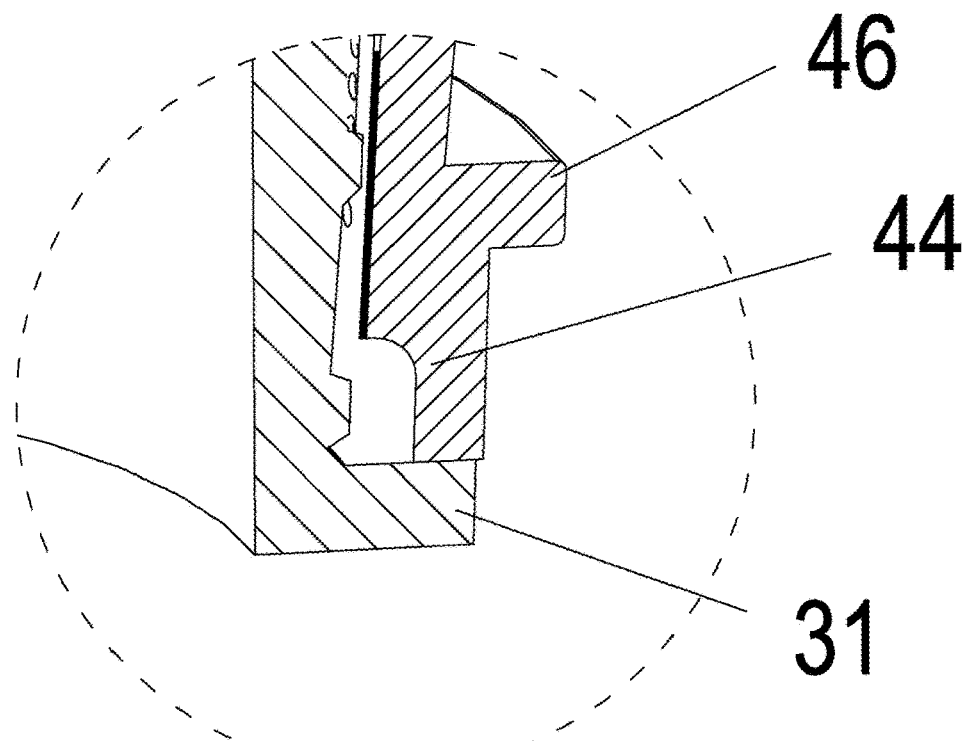
FIG. 5 is a detailed view of the area in circle 5 of FIG. 3.

Referring to FIGS. 1 to 5, a juicer in accordance with the invention comprises a removable housing 10, a feed chute 20 on the housing 10, a filtering mechanism 40 in the housing 10, and a rotating mechanism 30 in the filtering mechanism 40 as discussed in detail below.

The cylindrical housing 10 is open to top and includes an annular flange 11 on a top, a plurality of bent projections 12 on an inner surface of the flange 11, a plurality of troughs 13 each abutted on the projection 12 from below, two spaced, lower juice spouts 14 on a peripheral surface, and a support 15 on a bottom.

The cylindrical filtering mechanism 40 includes a plurality of longitudinal ridges 41 on an inner surface for increasing friction of produce, and a plurality of screens 42 each either releasably mounted on the inner surface between two adjacent ones of the ridges 41 or integrally formed with the inner surface. The replaceable screen 42 makes its replacement easier. The integrally formed screens 42 can greatly decrease the manufacturing cost.

The filtering mechanism 40 further comprises an internal space 43, a plurality of annular flanges 46 on an outer surface, a rim 44 extending downward from the lowest flange 46, and two spaced ports 45 (only one is shown) through the rim 44. The filtering mechanism is disposed in the housing 10. Preferably, widths of the ridges 41 are tapered downward.

The rotating mechanism 30 includes an annular element 31 on a bottom edge, a helical screw blade 32 on an outer surface for juicing, and an electric motor 33 for rotating the screw blade 32. The rotating mechanism 30 is disposed in the space 43 of the filtering mechanism 40. The rotating mechanism 30 is compact due to no positioning member.

The feed chute 20 includes an annular member 21 on a bottom edge, a rim 22 extending downward from the annular member 21, a plurality of spaced protuberances 23 on an outer surface of the rim 22, and a plurality of grooves 24 each abutted on the protuberance 23 from above. The feed chute 20 is vertical and occupies less space so that the produce may easily pass to a next stage.

In an assembled state, the annular element 31 of the rotating mechanism 30 is rested upon the support 15. The lowest flange 46 is also rested on the support 15. The electric motor 33 is disposed in the support 15. The rim 44 is rested on the annular element 31 and fastened by both the support 15 and the annular element 31. The bottom of the feed chute 20 is rested on the topmost flange 46 with the rim 22 abutted on the topmost flange 46. The annular member 21 is rested on the top of the flange 11. The protuberances 23 are complimentarily disposed in the troughs 13 and the projections 12 are complimentarily disposed in the grooves 24 respectively. Thus, the juicer can operate stably.

Preferably, an inner surface of a top of the helical screw blade 32 and a top of the rotating mechanism 30 are concave and joined. Thus, the central positioning axis of a top of the rotating mechanism 30 is eliminated. There is no projection out of the top of rotating mechanism 30 for joining a rotational axis of the housing 10. Thus, the space for accommodating produce is increased greatly.

In operation, produce may pass the feed chute 20 to be compacted between the rotating mechanism 30 and the ridges 41 and crushed into smaller sections prior to squeezing out its juice through the ports 45 and the juice spouts 14. A space is formed between the filtering mechanism 40 and the rotating mechanism 30 for accommodating the produce which may have width greater than radius of the rotating mechanism 30. A rotational axis of the rotating mechanism 30 is within a horizontal projection of the space.

The invention has the following advantageous effects in comparison with the prior art: The eccentric location of the top of the screw blade, the rotational axis of the rotating mechanism 30 is directly under the feed chute 20, and the rotational axis of the rotating mechanism 30 within the horizontal projection of the space all contribute to the increase of the space which can accommodate the produce having width greater than radius of the rotating mechanism 30. Thus, there is no need of cutting the produce into smaller sections prior to juicing operation. Further, the produce is prevented from clogging the space. As a result, the juicing has an increased performance.

While the invention has been described in terms of preferred embodiments, those skilled in the art will recognize that the invention can be practiced with modifications within the spirit and scope of the appended claims.

The invention claimed is:

1. A juicer comprising:
   a housing having a top and including a juice spout on a periphery surface, and a support on a bottom;
   a filtering mechanism disposed in the housing including a cylindrical wall having a meshed screen portion;
   a cylindrical feed chute disposed on and engaging the top of the housing,
   a rotating mechanism disposed in the filtering mechanism, the rotating mechanism including a screw comprising helical screw blade formed on an outer surface and extending helically upward and tapering to form a top free end, a bottom of the rotating mechanism being coupled to an electric motor and rotatable about a rotating axis of the electric motor, wherein the top free end of the screw is located at an eccentric position relative to the rotating axis and at an uppermost vertical point relative to the remainder of the screw, wherein the cylindrical feed chute is coaxially aligned with the screw with respect to the rotating axis, wherein a space is formed between the filtering mechanism and the screw that can accommodate produce having a width greater than a radius of the helical screw blade passing through the feed chute.

2. The juicer of claim 1, wherein the filtering mechanism includes at least one annular flange.

3. The juicer of claim 1, wherein the rotating mechanism includes an annular element on a bottom edge.

4. The juicer of claim 1, wherein the filtering mechanism further comprises at least one port through a lower part of the cylindrical wall of the filtering mechanism.

5. The juicer of claim 1, wherein the filtering mechanism includes a plurality of longitudinal ridges on an inner surface.

6. The juicer of claim 5, wherein the screen portion is mounted between two adjacent ones of the ridges.

7. The juicer of claim 1, wherein the screen portion is integrally formed with the inner surface of the filtering mechanism.

8. The juicer of claim 1, wherein the filtering mechanism comprises a top flange engaging with a bottom of the chute.

9. The juicer of claim 1, wherein the filtering mechanism comprises a plurality of annular flanges on an outer surface.

10. The juicer of claim 1, wherein the at least one annular flange of the filtering mechanism includes an annular flange at the lower end of the filter mechanism rested on the support of the housing.

11. The juicer of claim 1, wherein a bottom surface of the rotating mechanism is rested upon the support of the housing.

12. The juicer of claim 9, wherein the at least one annular flange of the filtering mechanism includes an annular flange at the topmost end of the filtering mechanism, and the top free end of the screw is located below the annular flange at the topmost end of the filtering mechanism.

13. A juicer comprising:
- a housing having a top and including a juice spout on a periphery surface, and a support on a bottom;
- a filtering mechanism disposed in the housing including a cylindrical wall having a meshed screen portion;
- a rotating mechanism disposed in the filtering mechanism, the rotating mechanism including a screw comprising a helical screw blade formed on an outer surface and extending helically upward to form a top free end, a bottom of the rotating mechanism being coupled to an electric motor and rotatable about a rotating axis of the electric motor, wherein the top free end of the screw is located at an eccentric position relative to the rotating axis; and
- a feed chute disposed on and engaging the top of the housing,
- wherein a bottom surface of the rotating mechanism is rested upon the support of the housing; and
- wherein the rotating mechanism includes an annular element on a bottom edge, and wherein a bottom surface of the filter mechanism is rested on the annular element of the rotating mechanism.

14. The juicer of claim 13, wherein a space is formed between the filtering mechanism and the screw for accommodating produce having a width greater than a radius of the helical screw blade passing through the feed chute.

* * * * *